United States Patent
Takeuchi et al.

(10) Patent No.: US 7,404,201 B2
(45) Date of Patent: Jul. 22, 2008

(54) DATA DISTRIBUTION SERVER

(75) Inventors: Tadashi Takeuchi, Yokohama (JP); Hiroshi Mine, Yokohama (JP); Damien Le Moal, Sagamihara (JP); Ikuko Kobayashi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 472 days.

(21) Appl. No.: 10/778,628

(22) Filed: Feb. 12, 2004

(65) Prior Publication Data
US 2004/0230996 A1 Nov. 18, 2004

(30) Foreign Application Priority Data
Feb. 14, 2003 (JP) ............................. 2003-035913

(51) Int. Cl.
*H04N 7/173* (2006.01)
*G06F 15/16* (2006.01)

(52) U.S. Cl. ...................... 725/109; 725/86; 725/87; 725/91; 725/92; 709/217; 709/219

(58) Field of Classification Search .............. 725/91–92, 725/145, 86–87; 709/203, 231, 217–219
See application file for complete search history.

(56) References Cited

U.S. PATENT DOCUMENTS

| | | | |
|---|---|---|---|
| 5,581,552 A * | 12/1996 | Civanlar et al. ............. 370/396 |
| 5,715,443 A * | 2/1998 | Yanagihara et al. ............. 707/3 |
| 5,815,146 A * | 9/1998 | Youden et al. ............. 715/720 |
| 6,269,394 B1 | 7/2001 | Kenner et al. |
| 6,370,571 B1 * | 4/2002 | Medin, Jr. ................... 709/218 |
| 6,421,726 B1 | 7/2002 | Kenner et al. |
| 6,449,730 B2 * | 9/2002 | Mann et al. ................... 714/6 |
| 6,553,413 B1 | 4/2003 | Leighton et al. |
| 6,711,572 B2 | 3/2004 | Zakharov et al. |
| 6,772,209 B1 | 8/2004 | Chernock et al. |
| 6,970,939 B2 * | 11/2005 | Sim ........................... 709/236 |
| 7,013,373 B2 * | 3/2006 | Mimatsu et al. ............. 711/162 |
| 7,080,400 B1 * | 7/2006 | Navar ......................... 725/139 |
| 7,100,192 B1 * | 8/2006 | Igawa et al. .................. 725/112 |
| 7,130,908 B1 * | 10/2006 | Pecus et al. .................. 709/226 |
| 7,188,357 B1 * | 3/2007 | Rieschl et al. ................. 725/92 |
| 2002/0059394 A1 * | 5/2002 | Sanders ....................... 709/217 |
| 2002/0059619 A1 * | 5/2002 | Lebar .......................... 725/87 |

(Continued)

OTHER PUBLICATIONS

Smart Content Deliver Service, www.ntt.com/globalip/scd_en/index.html, NTT Communications Corp., Tokyo, Japan.

*Primary Examiner*—Son P Huynh
(74) *Attorney, Agent, or Firm*—Townsend and Townsend and Crew LLP

(57) ABSTRACT

A copy computer includes a storage device which stores a copy of contents from a distribution computer and a module which creates a copy of updated contents based on a copy request and which sends a copy of contents requested by a search computer to a distribution request computer. The search computer includes a module which searches for a copy computer storing the copy of the contents requested by the distribution request computer, a module which forwards a send request to a specified copy computer, and a module which sends the copy request and the copy contents to a predetermined copy computer when the contents are updated. The copy request gives an instruction to create the copy of the updated contents in the storage device of the copy computer.

8 Claims, 17 Drawing Sheets

U.S. PATENT DOCUMENTS

| | | |
|---|---|---|
| 2002/0078174 A1 * | 6/2002 | Sim et al. .................. 709/219 |
| 2002/0152318 A1 | 10/2002 | Menon et al. |
| 2002/0154892 A1 * | 10/2002 | Hoshen et al. ................ 386/87 |
| 2002/0198780 A1 | 12/2002 | Kawakami et al. |
| 2003/0018978 A1 | 1/2003 | Singal et al. |
| 2003/0204856 A1 * | 10/2003 | Buxton ...................... 725/120 |
| 2004/0073596 A1 * | 4/2004 | Kloninger et al. ........... 709/200 |
| 2004/0117455 A1 | 6/2004 | Kaminsky et al. |
| 2004/0143850 A1 | 7/2004 | Costa |

* cited by examiner

FIG. 17

| 1001 | 1701 | 1002 | 1003 | 1004 | 1005 |
|---|---|---|---|---|---|
| REQUEST TYPE (REGISTRATION OR SEARCH) | CLIENT IP ADDRESS | REQUESTING SERVER IP ADDRESS | PREVIOUS SERVER IP ADDRESS | CONTENTS URL | REQUEST CACHE RATIO |

DATA DISTRIBUTION SERVER

CROSS-REFERENCE-TO RELATED APPLICATIONS

The present application claims priority upon Japanese Patent Application No. 2003-35913 filed on Feb. 14, 2003, which is herein incorporated by reference.

BACKGROUND OF THE INVENTION

1. Field of the Invention

The present invention relates to a contents distribution technology and more particularly to a method of efficiently distributing large volume of contents such as video data in a wide area network and an apparatus implementing the method.

2. Description of the Related Art

As the method of efficiently distributing large volume of contents such as video data in a wide area network, a method called contents distribution has hitherto been known (for example, "Smart Contents Distribution Service", [online], NTT communications, [searched on Feb. 12, 2003], Internet <URL: http://www.ntt.com/globalip/scd_en/>: this literature is herein incorporated by reference).

In this method, it is necessary to arrange a large number of copy servers in the wide area network. In the copy servers, copies of contents provided by a distribution server of a service provider are placed. In an actual contents distribution service, the service provider contracts with a provider (hereinafter, referred to as a "CDN provider") which provides the copy servers and a network, thereby obtaining a license to use the copy servers.

First, a client computer (in a company) requests the distribution server to distribute contents. Upon accepting this request, the distribution server locates a copy server nearest to the client and redirects the request for distribution of the contents to the located copy server by rewriting an IP address in a packet of the request. The copy server accepts the request for the distribution and distributes the contents to the client computer in place of the distribution server.

By using this method, the copy server performs (as proxy) a part of processing of contents distribution which should be performed by the distribution server. Accordingly, a load on the distribution server can be reduced. Moreover, since the contents are distributed from the copy server near the client in the network, the network bandwidth necessary for the contents distribution can be saved.

In the conventional method, the client receives contents distributed from the copy server by using the same protocol (for example, an HTTP protocol, an RTSP protocol or the like) as in the case of receiving contents distributed from the distribution server. In this case, it is an essential condition that the distribution server and the copy server use the same server software. Accordingly, it was not easy to introduce a new service using server software other than the server software (for example, a WWW server, a video distribution server or the like) installed in the servers owned by the CDN provider. Specifically, in the conventional method, when the service provider intended to introduce a new service which required introduction of a new data send/receive protocol, it was required that server software based on the new data send/receive protocol be installed in each server of the CDN provider.

Moreover, in the conventional method, when a plurality of server software applications based on different types of data send/receive protocols were installed in the servers owned by the CDN provider, a mechanism was not provided in which the plurality of server software applications share a disk capacity provided by the CDN provider. Accordingly, there was a problem that costs of managing disk capacities used by the respective server software applications became large. For example, when the CDN provider intended to change part of the disk capacity for use of a WWW server into the disk capacity for use of a video distribution server because extra space was gained in the disk capacity for use of the WWW server, the setting of the disk capacity for each server software application needed to be manually changed.

Furthermore, in the conventional method, the client computer which is to request the distribution of contents first requests the distribution server to distribute the contents, and the distribution server locates the copy server nearest to the client and then redirects the contents distribution request to the copy server. Accordingly, when contents on which access requests were concentrated at a time were included in a service, there was a problem of overhead for the access requests in the server of the service provider which performed the centralized management of contents.

SUMMARY OF THE INVENTION

An object of the present invention is to eliminate the necessity to install new server software in a large number of servers (copy servers) of a CDN provider on a network when a server of a service provider introduces a new service using server software based on any type of data send/receive protocol, by previously installing data distribution modules independent of the types of data send/receive protocol in the servers of the CDN provider and in proxy servers in the service provider and each company (client).

Another object of the present invention is to provide a contents transmission technology which allows server software applications different in types of data send/receive protocol to share a disk capacity without manual setting of disk capacities for the respective server software applications.

Still another object of the present invention is to eliminate the overhead for access requests in the server of the service provider which performs the centralized management of contents, in the case where contents on which access requests are concentrated at a time is included in a service.

A network system according to an embodiment of the present invention includes a distribution computer including a storage device which stores contents; and a distribution request computer which issues a send request to send the contents. The network system further includes at least one copy computer including a storage device which stores copy contents of the contents stored in the distribution computer; and a search computer including a contents search module and a distribution request relay module. The contents search module searches for a copy computer storing copy contents of the requested contents based on the send request from the distribution request computer to send the contents, and the distribution request relay module forwards the send request to the specified copy computer. The distribution computer further includes a contents registration module which sends a copy request and copy contents of the updated contents to a predetermined copy computer when the contents are updated. The copy request gives an instruction to create the copy contents of the updated contents in the storage device of the copy computer. The copy computer further includes a contents request receiving module which creates the copy contents of the updated contents based on the copy request and which sends the copy contents of the requested contents to the distribution request computer based on the send request from the search computer.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 17 is a view showing a data structure of the contents registration request and the contents search request in the third embodiment.

DETAILED DESCRIPTION OF THE INVENTION

At least the following matters will be made clear by the explanation in the present specification and the description of the accompanying drawings.

A description will be given of a first embodiment of the present invention with reference to FIGS. 1 to 12.

Figure 1:
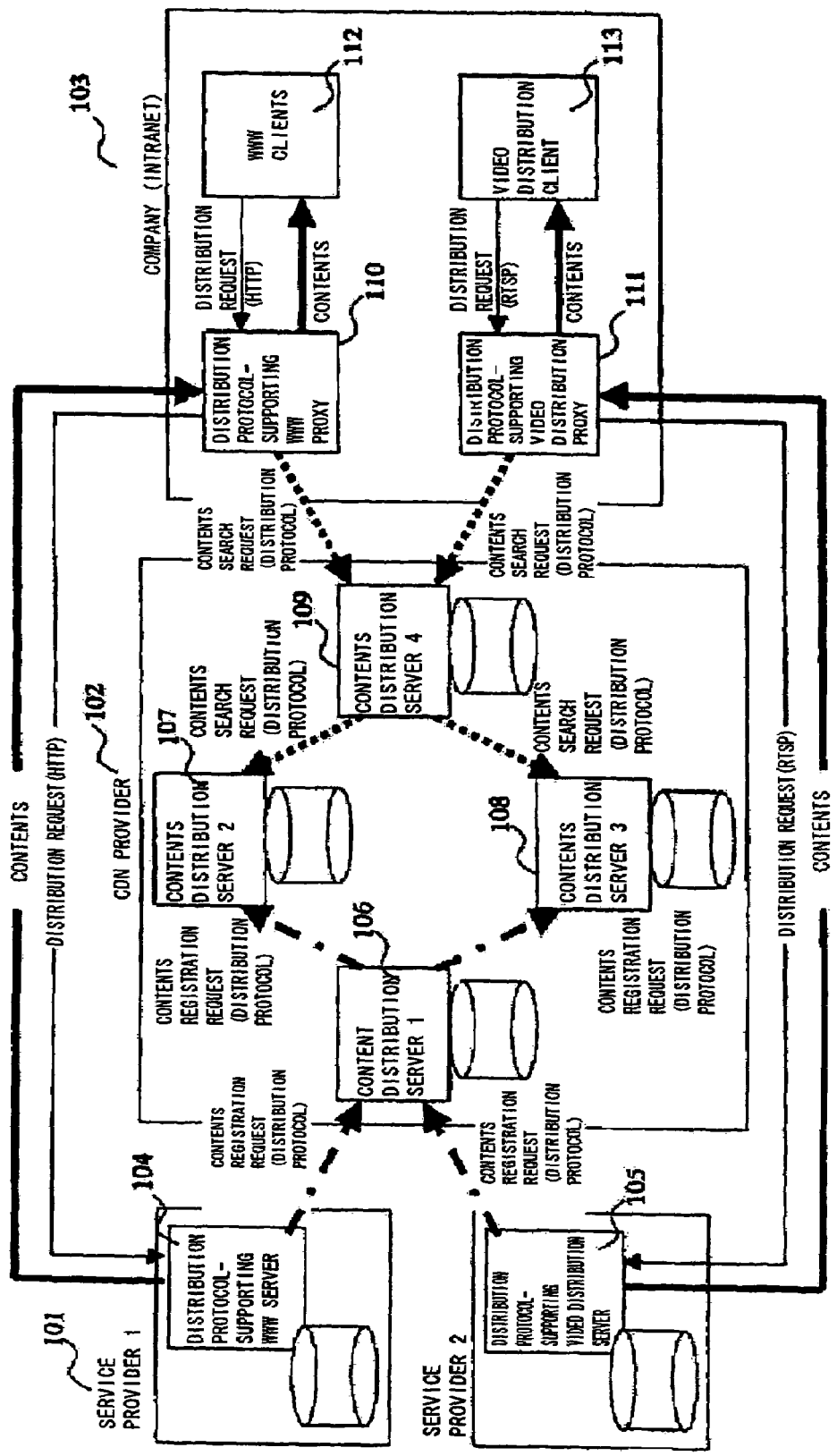
FIG. 1 is a view showing a system construction of a first embodiment.

FIG. 1 is a block diagram of a network system in a first embodiment of the present invention. In this embodiment, service providers 1 and 2 (101 and 102) offer contents distribution services by using a WWW server (104) and a video distribution server (105), respectively. A CDN provider (102) performs a contents distribution service for an intranet (103) of each company (client) by using contents distribution servers 1 to 4 (106 to 109). A WWW proxy (110) and a video distribution proxy (111), which are provided by each company, implement contents distribution to client servers (112 and 113) by using a protocol independent of a server application, called a distribution protocol. In order to support the distribution protocol, internal modules of the WWW server (104), the video distribution server (105), the WWW proxy (110), and the video distribution proxy (111) are modified.

The distribution protocol-supporting WWW server (104) and the distribution protocol-supporting video distribution server (105) are distribution computers each of which requests the contents distribution servers (106 to 109) to register contents by using the distribution protocol in advance of starting a service.

The contents distribution servers (106 to 109) are copy computers each of which creates copies of the contents stored in the distribution protocol-supporting WWW server and the distribution protocol-supporting video distribution server into a disk attached to each contents distribution server (106 to 109), based on the registration request.

The copies of the contents are not created in the disk of every contents distribution server (106 to 109). The distribution protocol-supporting WWW server (104) and the distribution protocol-supporting video distribution server (105) can specify which contents distribution server (106 to 109) the copy is created in when issuing the contents registration request.

The WWW client (112) and the video distribution client (113) are distribution request computers each of which sends a distribution request to the distribution protocol-supporting WWW proxy (110) or the distribution protocol-supporting video distribution proxy (111) to receive a contents distribution service.

The distribution protocol-supporting WWW proxy (110) and the distribution protocol-supporting video distribution proxy (111) are search computers each of which issues a contents search request to a group of the contents distribution servers (106 to 109) by using the distribution protocol upon accepting the distribution request.

Upon accepting the contents search request, each of the contents distribution servers (106 to 109) examines whether contents requested to be retrieved exist in the disk attached to its own node.

If the contents exist in its own disk as a result of the examination, each of the contents distribution servers (106 to 109) sends the requested contents to the distribution protocol-supporting WWW proxy (110) or the distribution protocol-supporting video distribution proxy (111).

The distribution protocol-supporting WWW proxy (110) or the distribution protocol-supporting video distribution proxy (111) forwards the received contents to the WWW client (112) or the video distribution client (113).

As a result of the examination, if neither of the contents distribution servers (106 to 109) contains the contents in the disks thereof, the group of the contents distribution servers (106 to 109) issues distribution requests to the distribution protocol-supporting WWW server (104) and the distribution protocol-supporting video distribution server (105).

Upon receiving this distribution request, each of the distribution protocol-supporting WWW server (104) and the distribution protocol-supporting video distribution server (105) sends the contents to the WWW client (112) or the video distribution client (113). Note that, upon receiving the distribution request, each of the distribution protocol-supporting WWW server (104) and the distribution protocol-supporting video distribution server (105) may forward the requested contents to the group of the contents distribution servers (106 to 109), and the group of the contents distribution servers (106 to 109) which has received the forwarded contents may then send the contents to the WWW client (112) or the video distribution client (113).

Accordingly, it is sufficient that each of the distribution protocol-supporting WWW server (104) and the distribution protocol-supporting video distribution server (105) distributes contents only when all the contents distribution servers (106 to 109) do not contain the contents requested to be retrieved, thus reducing loads on these WWW server and video distribution server. Moreover, the total amount of network bandwidth required for contents distribution can be saved.

Moreover, contents are stored in or read from the disks attached to the contents distribution servers (106 to 109) by using the distribution protocol, which does not depend on the HTTP protocol or the RTSP protocol. Accordingly, contents can be distributed using the servers and the disks provided by the CDN provider even when any server application using a different transmission protocol runs in the servers on the service provider side.

Moreover, contents provided by both the distribution protocol-supporting WWW server (104) and the distribution protocol-supporting video distribution server (105) can be read from and written in the disks attached to the contents distribution servers (106 to 109) regardless of the difference in the transmission protocol. Consequently, this eliminates the necessity for the CDN provider to set a disk capacity for each server application.

Hereinafter, a detailed description will be given of operation procedures of the distribution protocol-supporting WWW server (104), the distribution protocol-supporting video distribution server (105), the distribution protocol-supporting WWW proxy (110), the distribution protocol-supporting video distribution proxy (111), and the contents distribution servers (106 to 109).

Figure 18:
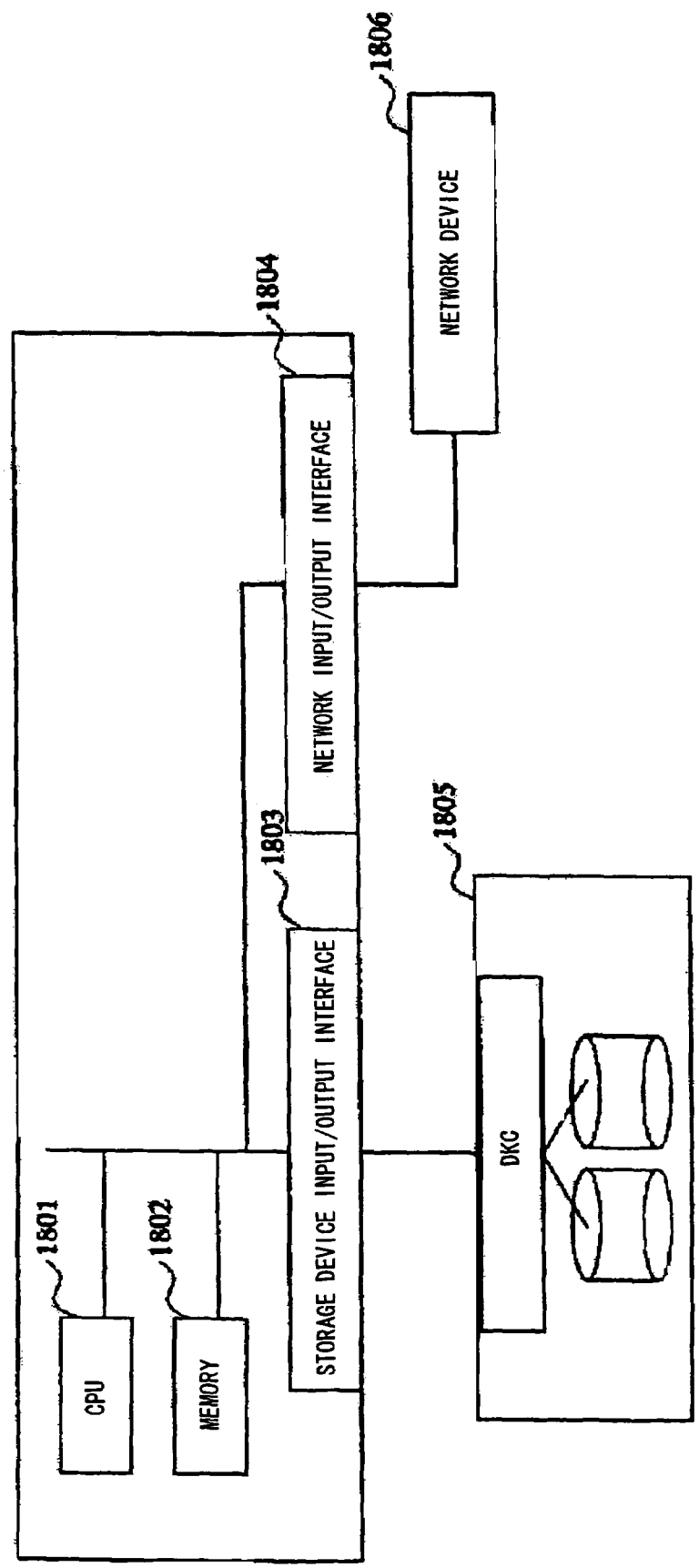
FIG. 18 is a block diagram showing a hardware configuration of the distribution protocol-supporting WWW server (104), the distribution protocol-supporting video distribution server (105), the distribution protocol-supporting WWW proxy (110), the distribution protocol-supporting video distribution proxy (111), and the contents distribution servers (106 to 109).

FIG. 18 is a hardware block diagram of each computer of the distribution protocol-supporting WWW server (104), the distribution protocol-supporting video distribution server (105), the distribution protocol-supporting WWW proxy (110), the distribution protocol-supporting video distribution proxy (111), and the contents distribution servers (106 to 109).

Each of these servers is a computer including a CPU (1801) and a memory (1802). The CPU (1801) executes a program loaded on the memory (1802). Data structures used during program execution are also loaded on the memory (1802) and can be referred to during the program execution.

Each of these servers is also connected to a storage device (1805) through a storage device input/output unit (1803). The CPU (1801) can store contents stored in the storage device (1805) into the memory (1802). Reversely, the CPU (1801) can also store contents stored in the memory (1802) into the storage device (1805).

Each of these servers is connected to a network device (1806) through a network device input/output unit (1804).

The CPU (1801) outputs contents stored in the memory (1802), a contents search request, or a contents registration request through the network device input/output unit (1803) in accordance with each stored program. Reversely, the CPU (1801) receives contents, a contents search request, or a contents registration request from the network device (1806) through the network device input/output unit (1804) and stores the same in the memory (1802) in accordance with each stored program.

By these procedures performed by each server, the contents, the contents search request, or the contents registration request is sent and received between the servers.

A detailed description will be given below of an execution procedure of the program loaded on the memory of each server. The program reads and stores contents data from and into the storage device and allows the nodes to send and receive the contents, the contents search requests and the contents registration requests therebetween. Note that this program is stored in a recording medium (for example, a magnetic disk, etc.) readable from each server, and the server can install the program from this recording medium into the memory (1802). Each server may directly store each program into the memory (1802) through a network.

These servers may be so-called Network Attached System nodes, each of which translates file based I/O requests received from the network device (1806) into block based I/O requests and issues the block based I/O requests to the storage device (1805). Reversely, each node collects block level data from the storage device (1805) into files and sends the files to the network device (1806). Moreover, each of these servers and the storage device (1805) may be in a single package. Furthermore, functions implemented by each server and the function of translating the file based I/O requests to the block based I/O requests may be implemented by a disk controller (DKC) of the storage device (1805) instead of the server.

Figure 2:
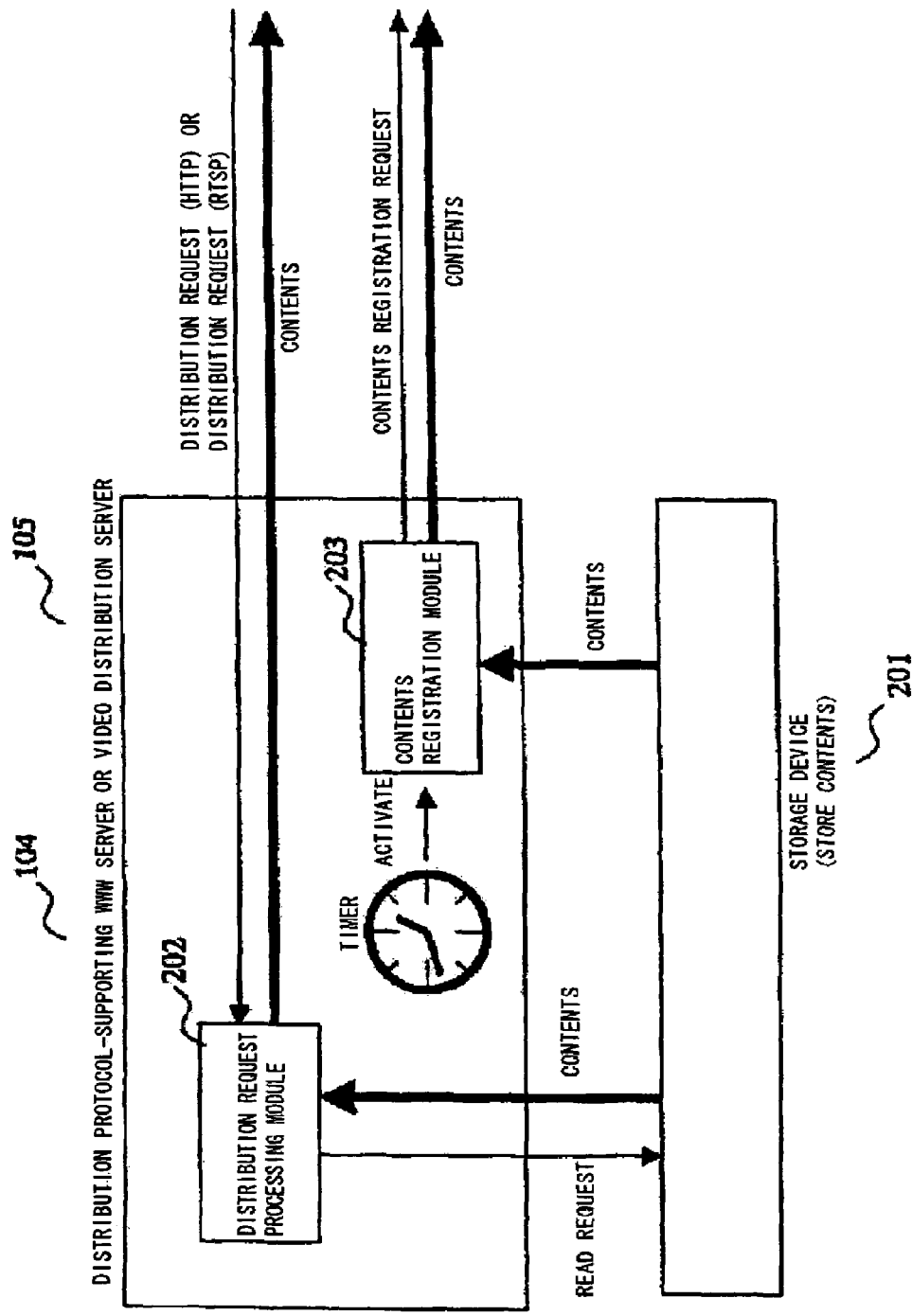
FIG. 2 is a block diagram showing operation procedures of a distribution protocol-supporting WWW server (104) and a distribution protocol-supporting video distribution server (105)

FIG. 2 is a block diagram showing functions implemented by the programs of the distribution protocol-supporting WWW server (104) and the distribution protocol-supporting video distribution server (105). Note that each function may be implemented by hardware which implements the function, such as a circuit, instead of by software such as a program. The same applies to the other servers (106 to 109, 110, 111, 112 and 113).

Each of the distribution protocol-supporting WWW server (104) and the distribution protocol-supporting video distribution server (105) is composed of a distribution request processing module (202) and a contents registration module (203) and contains a storage device (201), such as a disk, for storing contents.

Each of the distribution protocol-supporting www server (104) and the distribution protocol-supporting video distribution server (105) periodically activates the contents registration module (203) in order to issue a contents registration request to the group of the contents distribution servers (106 to 109). This module (203) searches the storage device (201) to check whether new contents are stored. If new contents are stored, this module (203) reads the contents from the storage device (201) and sends the contents and a contents registration request to the group of the contents distribution servers (106 to 109). Note that this module (203) may specify one or more of the contents distribution servers (106 to 109) to which the contents is to be sent according to a network state or a type of the contents. Moreover, this module (203) may control a time to send copy contents and a contents registration request thereof according to the network state or the type of the contents. Herein, the network state includes factors affecting delays in a network, such as a network distance which is the number of routers or the number of hops in ISP up to the distributed server (106 to 109) to which the copy contents and the contents registration request are sent; a network distance up to the client server (112 or 113) which should be prioritized based on the type of the copy contents; congestion of the distributed servers (106 to 109); the performance of the distributed servers (106 to 109); and congestion in the network route. Herein, the "network" means not only the network up to the distributed server (106 to 109) to which the copy contents and the contents registration request are to be sent, but also the network to the client server (112 or 113) which should be prioritized based on the type of the copy contents.

Each distribution request processing module (202) of the distribution protocol-supporting WWW server (104) and the distribution protocol-supporting video distribution server (105) also operates upon receiving a distribution request from the distribution protocol-supporting WWW proxy (110) or the distribution protocol-supporting video distribution (111).

This module (202) reads contents from the storage device (201) and sends the contents to the distribution protocol-supporting WWW proxy (110) or the distribution protocol-supporting video distribution proxy (111).

Figure 3:
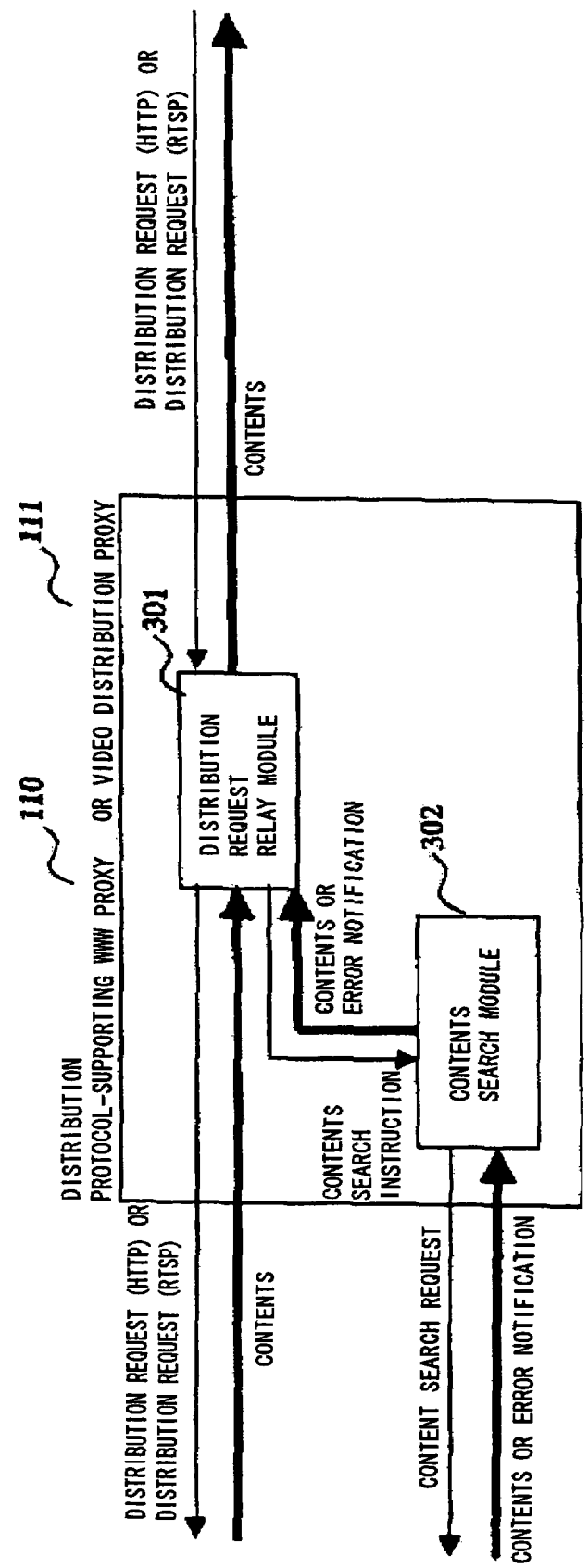
FIG. 3 is a block diagram showing operation procedures of a distribution protocol-supporting WWW proxy (110) and a distribution protocol-supporting video distribution proxy (111)

FIG. 3 is a block diagram showing a function implemented by the programs of the distribution protocol-supporting WWW (110) and distribution protocol-supporting video distribution proxy (111).

Each of the distribution protocol-supporting WWW proxy (110) and the distribution protocol-supporting video distribution proxy (111) is composed of a distribution request relay module (301) and a contents search module (302).

Each distribution request relay module (301) of the distribution protocol-supporting Www proxy (110) and the distribution protocol-supporting video distribution proxy (111) operates upon receiving a distribution request from the WWW client (112) or the video distribution client (113). The distribution request relay module (301) instructs the contents search module (302) to search for contents.

The contents search module (302) issues a contents search request to the contents distribution servers (106 to 109). Note that the contents search module (302) may specify the contents distribution server (106 to 109) to which the contents search request is issued based on a map which shows the contents distribution servers (106 to 109) each holding contents. In this case, the distribution protocol-supporting WWW server (104) and the distribution protocol-supporting video distribution server (105) may create the map and send the created map to the distribution protocol-supporting WWW proxy (110) and the distribution protocol-supporting video distribution proxy (111) periodically or at each update of the map.

Upon receiving the contents search request, each contents distribution server (106 to 109) searches whether the requested contents are stored in a storage device (401).

If the requested contents are stored, the contents distribution server (106 to 109) sends the contents to the distribution protocol-supporting WWW proxy (110) or the distribution protocol-supporting video distribution proxy (111). If the contents are not stored therein, the contents distribution server (106 to 109) notifies the distribution protocol-supporting WWW proxy (110) or the distribution protocol-supporting video distribution proxy (111) that the contents are not stored.

Upon accepting the contents, the contents search module (302) sends the contents to the WWW client (112) or the video distribution client (113) through the distribution request relay module (301).

On the other hand, upon receiving an error notification, the distribution request relay module (301) sends distribution requests to the distribution protocol-supporting WWW server (104) and the distribution protocol-supporting video distribution server (105).

Each of The distribution protocol-supporting WWW server (104) and the distribution protocol-supporting video distribution server (105) sends the requested contents to the WWW client (112) or the video distribution client (113).

FIGS. 4 to 12 are views showing operation procedures of the contents distribution servers (106 to 109).

Figure 4:
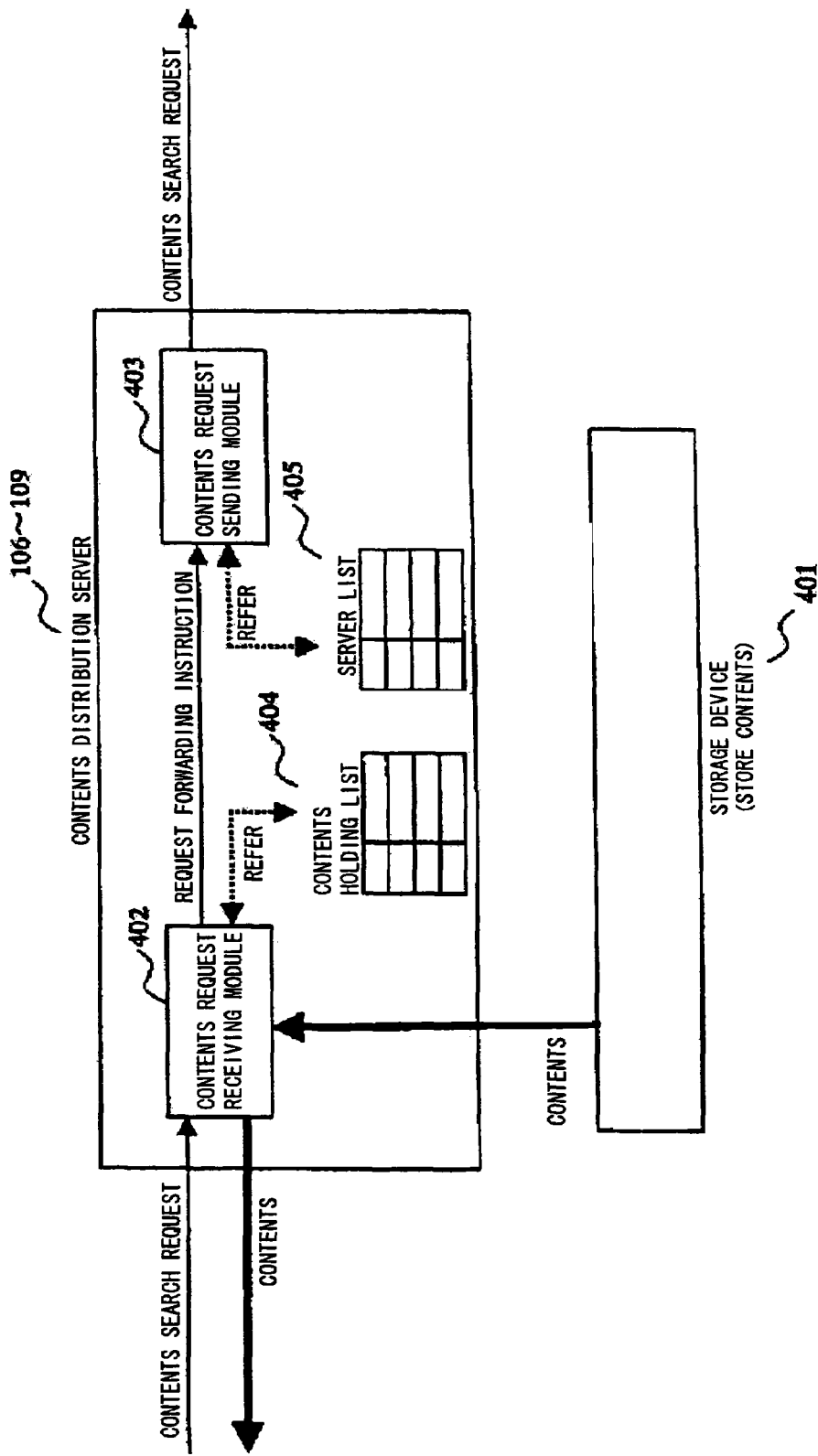
FIG. 4 is a block diagram showing operation procedures of contents distribution servers (106 to 109) upon receipt of a contents search request.

FIG. 4 is a block diagram showing functions implemented by a program of the contents distribution servers (106 to 109) when the contents distribution servers (106 to 109) receive search requests from the distribution protocol-supporting WWW proxy (110) or the distribution protocol-supporting video distribution proxy (111).

Each of the contents distribution servers (106 to 109) is composed of a contents request receiving module (402) and a contents request sending module (403), and contains the storage device (401), such as a disk, for storing contents. The contents distribution server stores two data structures of a contents holding list (404) and a server list (405) on the memory.

Figure 11:
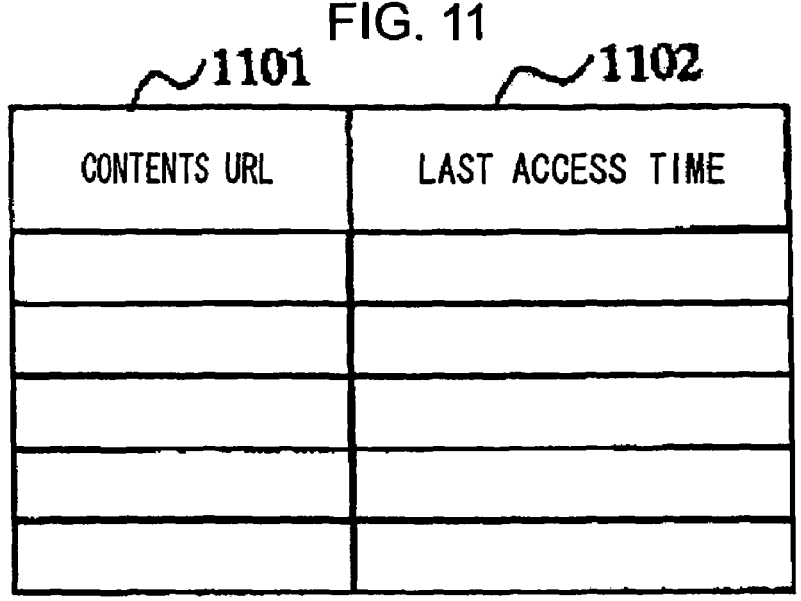
FIG. 11 is a table showing a data structure of a contents storing list (404)

FIG. 11 shows a data structure of the contents holding list (404).

The contents holding list (404) is a list for managing contents stored in the storage device. The contents holding list (404) is composed of two fields of a contents URL field (1101) to uniquely identify contents and a last access time field (1102) to store times of the last accesses to the contents. This list is initialized to empty.

Figure 12:
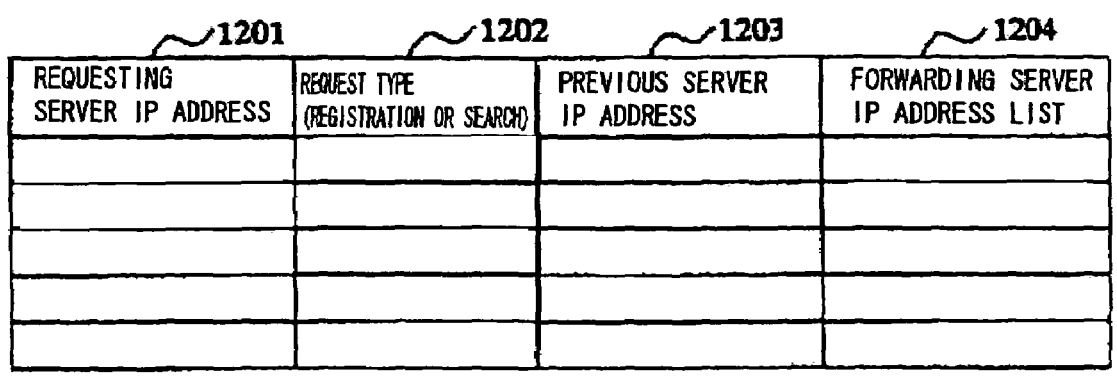
FIG. 12 is a table showing a data structure of a server list (405)

FIG. 12 shows a data structure of the server list (405).

The server list (405) is a list for managing neighboring relationships between the contents distribution servers. The contents distribution servers having neighboring relationships send and receive the contents search request or the contents registration request in the distribution protocol therebetween. Fields included in this list (405) are shown below.

A requesting server IP address field (1201) is a field to store IP addresses of servers which issue a contents registration request or a contents search request. Note that this field may store only IP addresses of servers owned by other than the CDN provider.

A request type field (1202) is a field to store identification between the contents registration request and the contents search request.

The neighboring relationship between the contents distribution servers is defined for each requesting server IP address and each request type. When the IP addresses of the requesting servers are different, or depending on whether the request type is the contents registration request or the contents search request, the server which the request is sent to or received from varies.

A previous server IP address field (1203) is a field to store IP addresses of servers which have sent a request for contents.

A forwarding destination server IP address list field (1204) is a field to store IP addresses of the contents distribution servers to which the contents request is to be sent. All entries in the server list stored in the contents distribution server are properly set by the CDN provider in advance.

Figure 10:
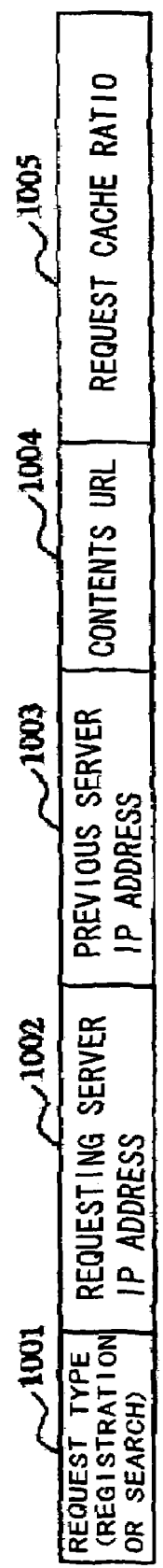
FIG. 10 is a view showing a data structure of the contents registration request and the contents search request.

FIG. 10 shows information included in the contents search request.

A request type field (1001) is a field to identify whether the request is the contents registration request or the contents search request. In a step 501 to be described later, this field stores information to identify the type of the request as contents search.

A requesting server IP address field (1002) is a field to indicate an IP address of a server which has issued the request. Herein, this server is owned by other than the CDN provider.

A previous server IP address field (1003) is a field to indicate an IP address of a server which has sent the request. Herein, this server is a contents distribution server or a server owned by other than the CDN provider.

A contents URL field (1004) is a field to store information to uniquely identify requested contents.

A request cache ratio field (1005) is a field used only when the request is the contents registration request. This field stores a ratio that the contents distribution server which has received the contents registration request stores (caches) contents to be registered in the storage device.

Figure 5:
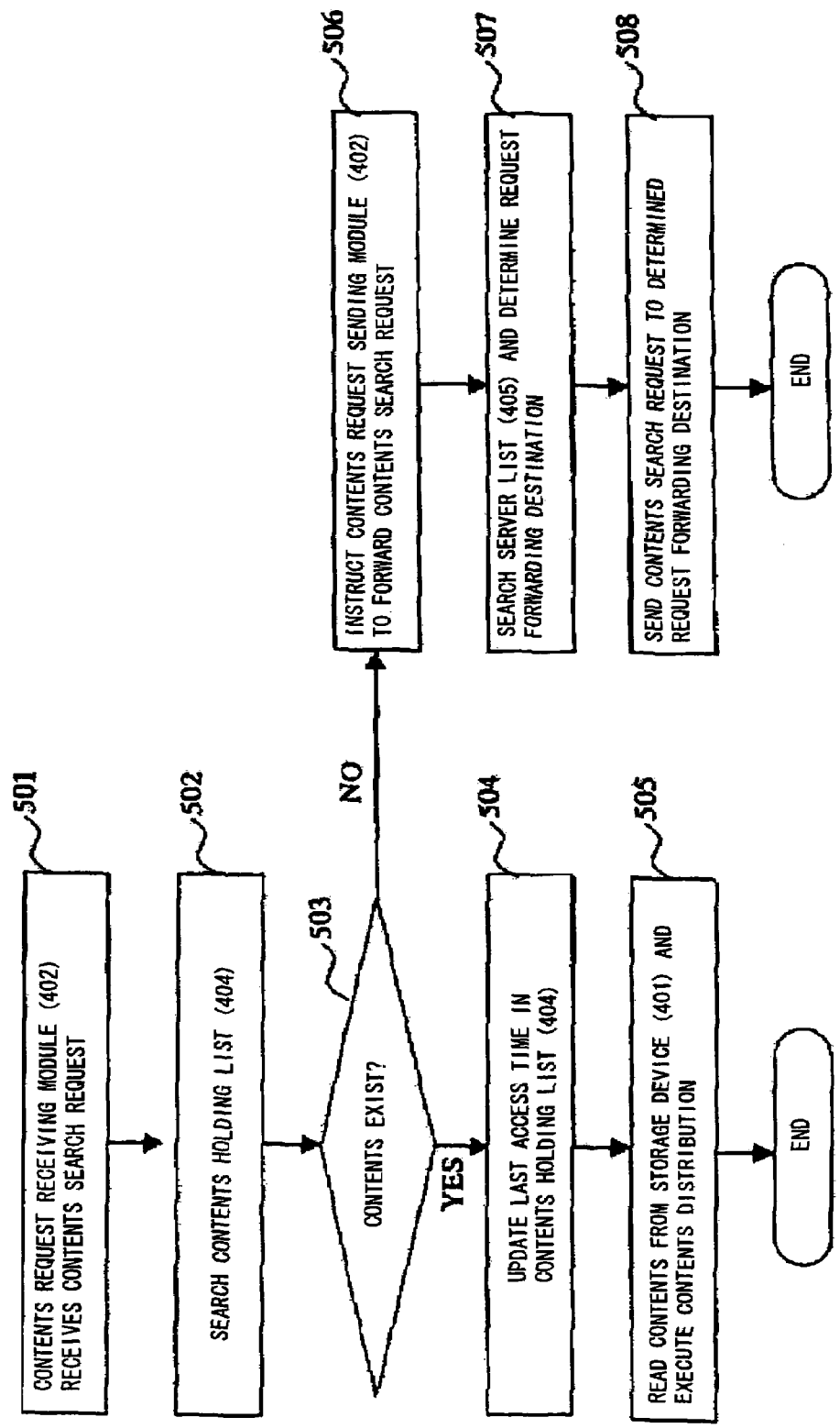
FIG. 5 is an operation flowchart of the contents distribution servers (106 to 109) upon receipt of the contents search request.

FIG. 5 shows an operation flowchart in the case where each of the contents distribution servers (106 to 109) accepts the search request from the distribution protocol-supporting WWW proxy (110) or the distribution protocol-supporting video distribution proxy (111).

First, in the step 501, the contents request receiving module (402) receives a contents search request. Herein, the contents request receiving module (402) stores information to identify that the request is a contents search request, into the request type field (1001).

In a step 502, the contents request receiving module (402) searches the contents holding list (404).

In a step 503, when there is an entry, in the contents holding list (404), which matches a value in the contents URL field of the contents search request accepted in the step 501, the procedure goes to a step 504, and in the other cases, jumps to a step 506.

In the step 504, the contents request receiving module (402) updates the last access time field of the contents holding list (404) to the current time.

In a step 505, the contents request receiving module (402) reads from the storage device (401) contents specified by the contents URL field of the contents search request received in the step 501. The contents request receiving module (402) sends the read contents to the server which has sent the contents search request, that is, the server specified by the previous server IP address field of the received request, and then finishes the processing.

In the step 506, the contents request receiving module (402) instructs the contents request sending module (403) to forward the contents search request.

In a step 507, the contents request sending module (403) searches the server list (405). As a result of the search, in the case of accepting a request to register the contents stored in the contents URL field of the contents registration request, the contents request sending module (403) determines which contents distribution server the request is to be forwarded to by referring to the forwarding destination server IP address list field (1204) of the entry in the server list (405). Sometimes there could be no contents distribution server to which the contents are to be forwarded. In this case, the contents request sending module (403) sends an error notification to the server which has issued the request (the server is determined with reference to the requesting server IP address field (1002) of the request), and then finishes the processing.

In a step 508, if the contents distribution server (106 to 109) determined in the step 507 exists, the contents request sending module (403) sends the contents search request to the contents distribution server (106 to 109) of interest, and then finishes the processing.

Herein, the contents request sending module (403) sets each field of the contents search request to be sent as follows. Values in the request type field (1001), the requesting server IP address field (1002), the contents URL field (1004), and the request cache ratio field (1005) of the received request are not updated to be sent. The contents request sending module (403) updates a value in the previous server IP address field (1003) to the IP address of its own node.

Figure 6:
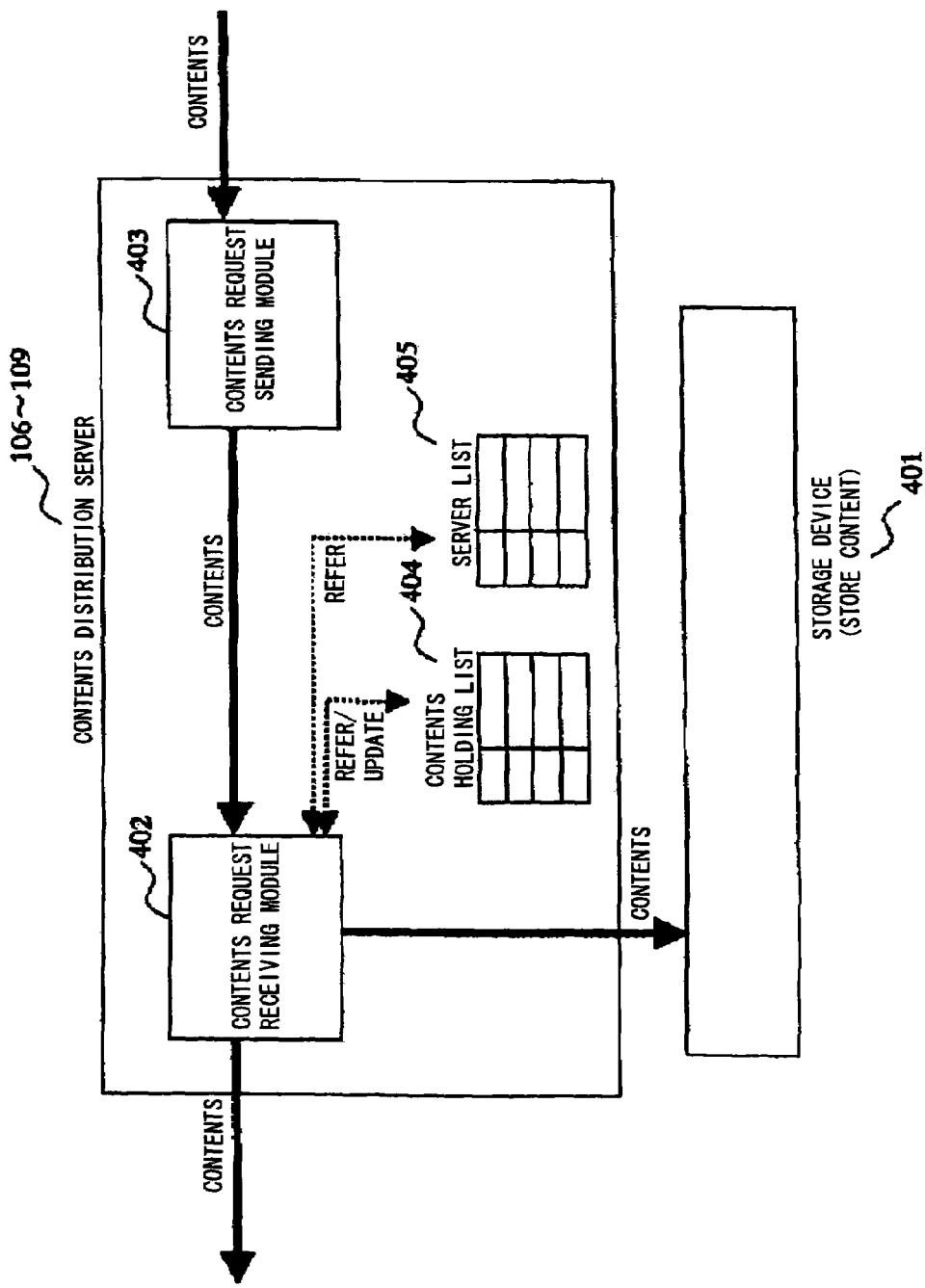
FIG. 6 is a block diagram showing operation procedures of the contents distribution servers (106 to 109) upon receipt of the contents.
Figure 7:
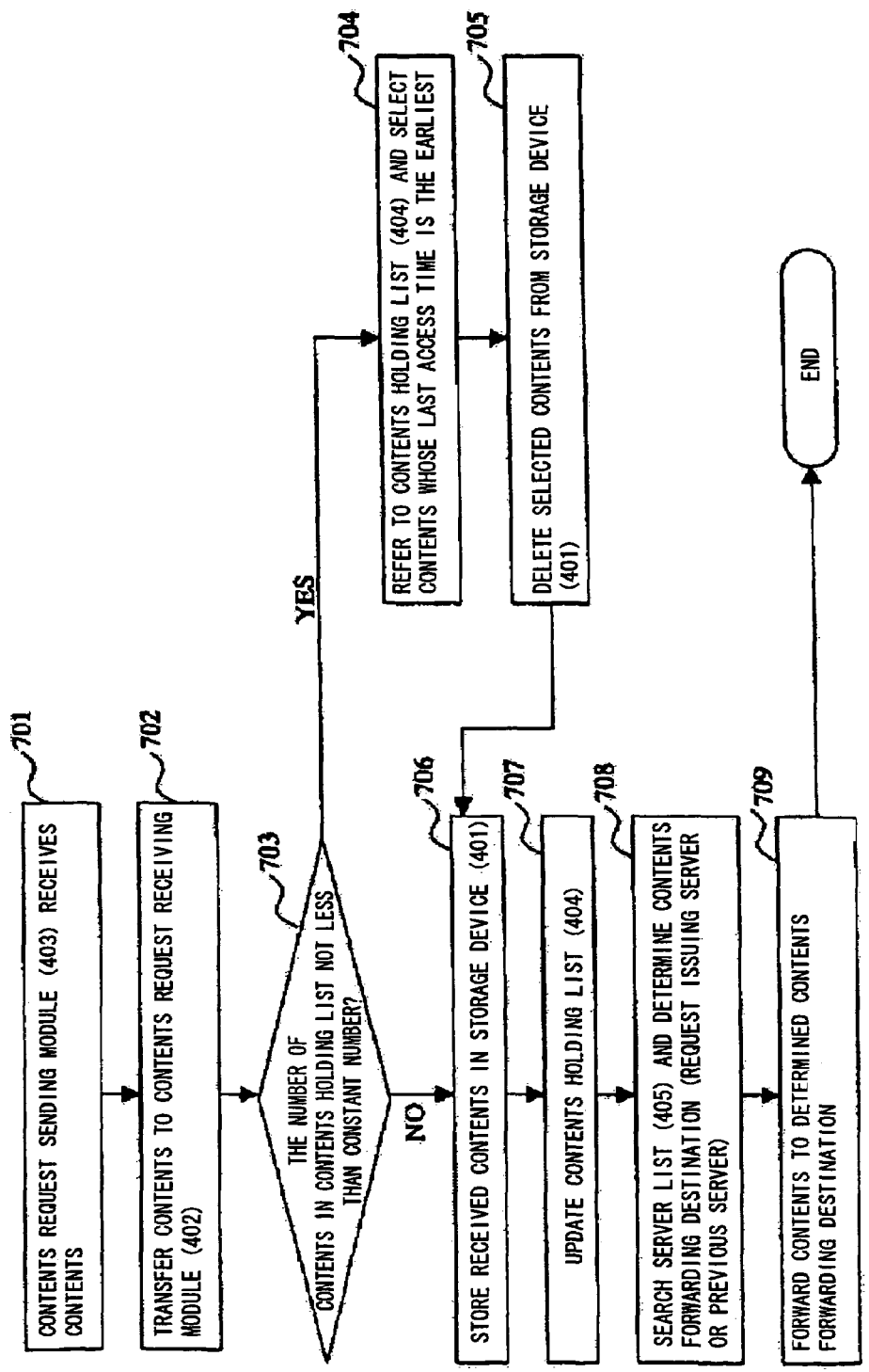
FIG. 7 is an operation flowchart of the contents distribution servers (106 to 109) upon receipt of the contents.

FIGS. 6 and 7 show a function block diagram and a flowchart, respectively, showing operation of the contents distribution server (106 to 109) in receiving requested contents from another contents distribution server (106 to 109) upon execution of the steps 506 to 508 in FIG. 5.

In a step 701, the contents request sending module (403) receives the contents.

In a step 702, the contents request sending module (403) forwards the received contents to the contents request receiving module (402).

In a step 703, the contents request receiving module (402) retrieves the number of entries registered in the contents holding list (404) and checks whether the number of the entries is not less than the number of contents which can be stored in the storage device. When the number of the entries is not less than the number of contents which can be stored, steps 704 and 705 are executed to replace contents stored in the storage device. In other cases, the procedure jumps to a step 706.

In the step 704, the contents request receiving module (402) refers to the contents holding list (404) and selects an entry whose last access time field (1102) indicates the earliest time.

In the step 705, the contents request receiving module (402) deletes contents corresponding to the entry selected in the step 704.

In the step 706, the contents request receiving module (402) stores the received contents into the storage device (401).

In a step 707, the contents request receiving module (402) updates the contents holding list (404) to add an entry corresponding to the contents stored in the step 706. The contents request receiving module (402) stores the current time in the contents last access time field (1102) of this entry.

In a step 708, the contents request receiving module (402) searches the server list (405) and determines an entry corresponding to the received contents. A server specified by the previous server IP address field (1203) of the entry is determined as the destination to which the contents are forwarded.

In a step 709, the contents request receiving module (402) sends the contents to the server determined in the step 708 and finishes the processing.

Figure 8:
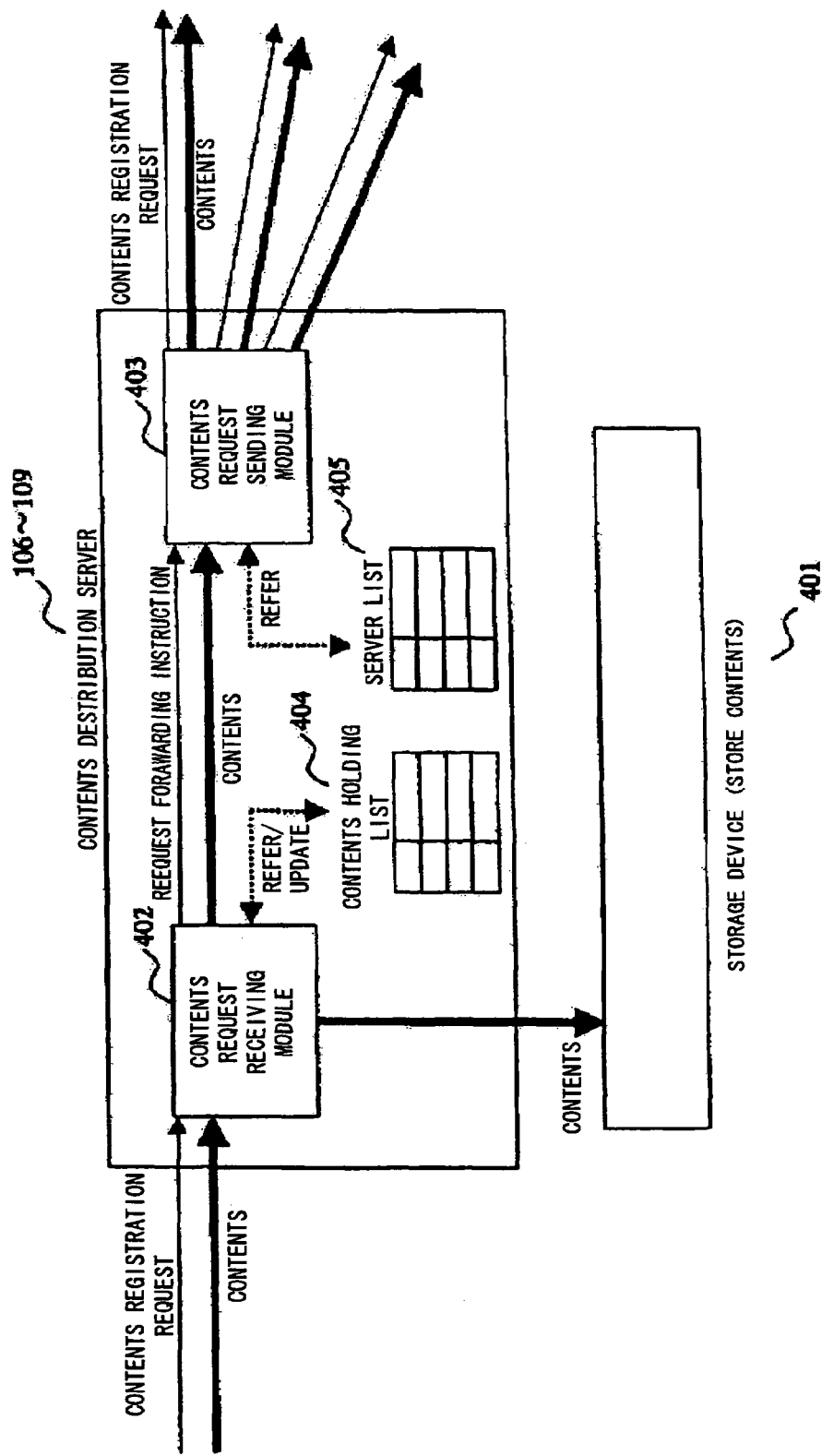
FIG. 8 is a view showing operation procedures of the contents distribution servers (106 to 109) upon receipt of a contents registration request.
Figure 9:
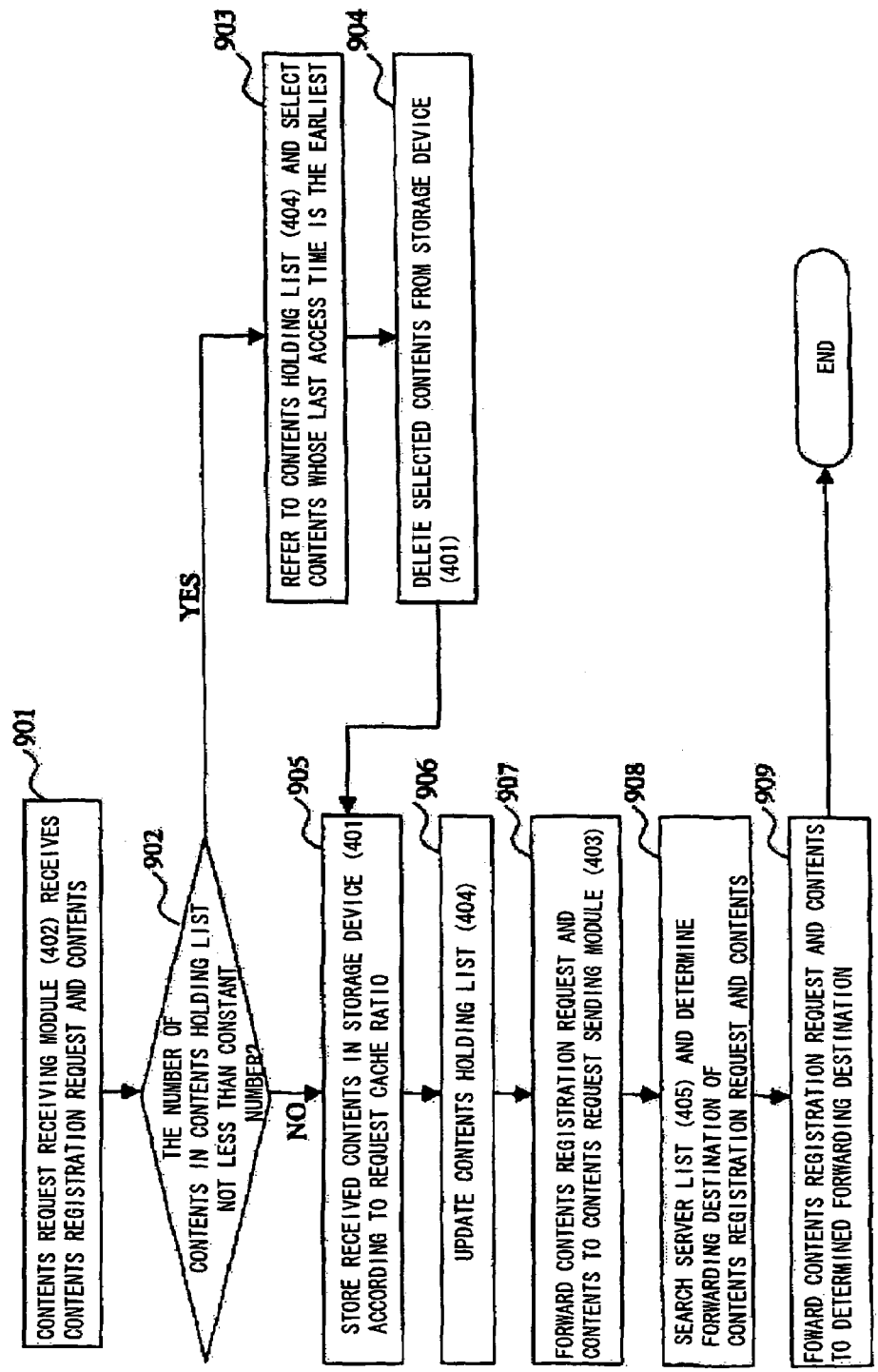
FIG. 9 is an operation flowchart of the contents distribution servers (106 to 109) in registration of the contents.

FIGS. 8 and 9 illustrate a function block diagram and a flowchart, respectively, showing operation in the case where each of the contents distribution servers (106 to 109) receives a contents registration request and contents requested to be registered.

In a step 901, the contents request receiving module (402) receives the contents registration request and the contents to be registered.

In step 902, the contents request receiving module (402) retrieves the number of entries registered in the contents holding list (404) and checks whether the number of the entries is not less than the number of contents which can be stored in the storage device. When the number of the entries is not less than the number of contents which can be stored, steps 903 and 904 are executed to replace contents stored in the storage device. In other cases, the procedure jumps to a step 905.

In the step 903, the contents request receiving module (402) refers to the contents holding list (404) and selects an entry whose last access time field (1102) indicates the earliest time.

In the step 904, the contents request receiving module (402) deletes contents corresponding to the entry selected in the step 903 from the storage device (401).

In the step 905, the contents request receiving module (402) determines whether the received contents are to be stored in the storage device. This is determined based on a possibility according to the request cache ratio field (1005) of the received contents registration request. When it is determined to store the received contents, the contents are stored in the storage device (401).

In a step 906, the contents request receiving module (402) updates the contents holding list (404). However, when the contents are not stored in the step 905, this update is not performed. Specifically, a new entry corresponding to the contents stored in the step 905 is added. The last access time field (1102) of the contents holding list is updated to the current time.

In a step 907, the contents request receiving module (402) transfers the contents registration request and the contents to the contents request sending module (403).

In a step 908, the contents request sending module (403) searches the server list (405) and detects an entry corresponding to the transferred contents registration request. The contents request sending module (403) determines the forwarding destination of the contents by referring to the forwarding destination server IP address field (1204) of the entry. In some cases, no forwarding destination of the contents exists.

In a step 909, when the forwarding destination determined in the step 908 exists, the contents request sending module (403) forwards the contents registration request and the contents to the forwarding destination, and then finishes the processing. The contents request sending module (403) sets each field of the contents registration request to be sent as follows. Values in the request type field (1001), the requesting server IP address field (1002), the contents URL field (1004), and the request cache ratio field (1005) are not updated to be sent. The contents request sending module (403) updates the previous server IP address field (1003) to the IP address of its own node.

Note that the above described functions of the distribution request module (301) and the contents search module (302) may be provided for another server (for example, any one or more of the contents distribution servers (106 to 109)). The function of the contents registration module (203) may also be provided for another server (for example, any one or more of the contents distribution servers (106 to 109)).

Figure 13:
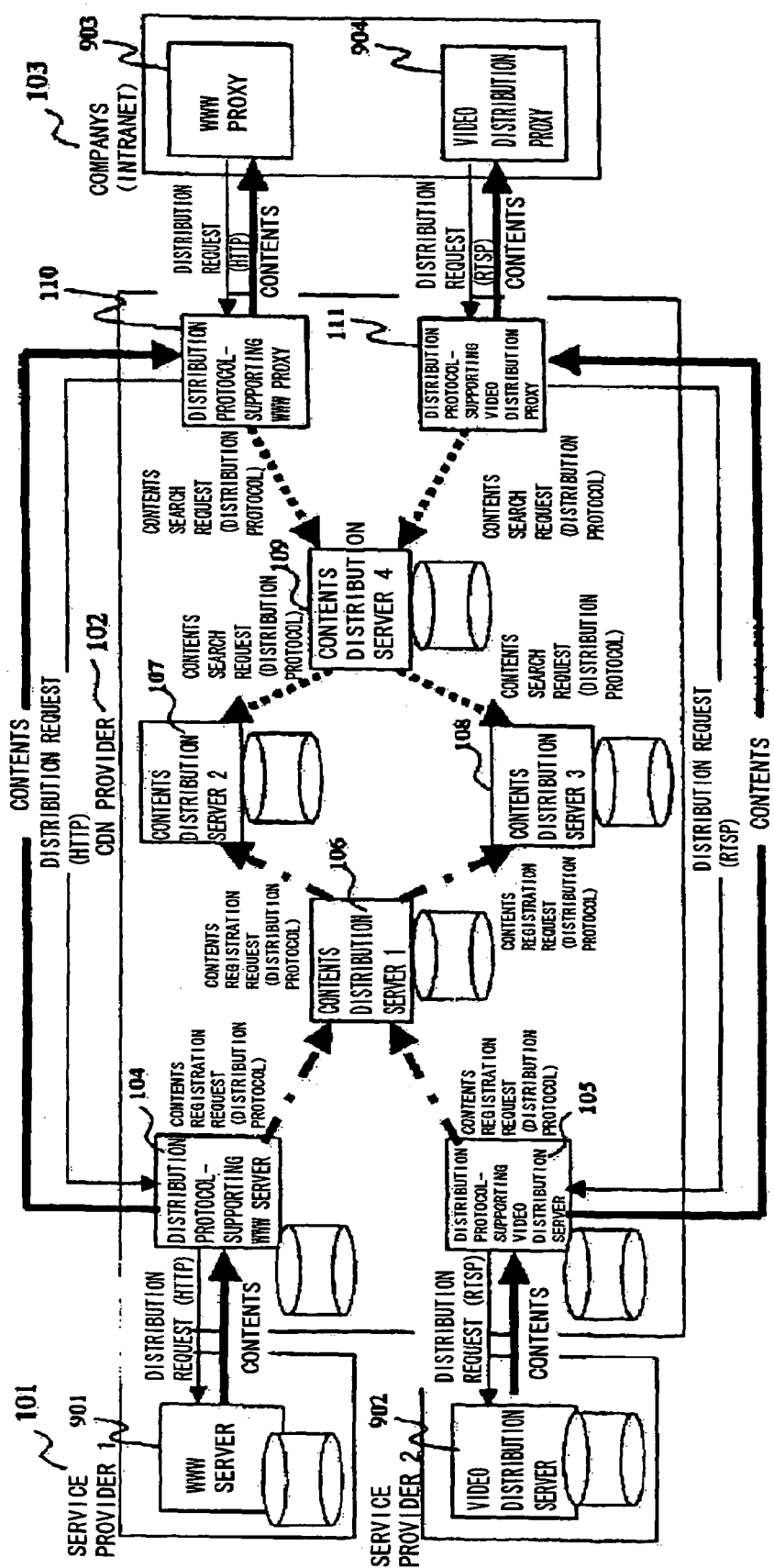
FIG. 13 is a view showing operation procedures of a second embodiment.

FIG. 13 is a diagram showing a network construction of a second embodiment of the present invention.

In the first embodiment, it is necessary to add some modification to the internal modules of the WWW server, the video distribution server, the WWW proxy, and the video distribution proxy, which are owned by other than the CDN provider (102), but this necessity is eliminated in this embodiment.

A WWW proxy (903) and a video distribution proxy (904) provided by each company are search computers each of which issues a distribution request to the corresponding distribution protocol-supporting WWW proxy (110) or distribution protocol-supporting video distribution proxy (111) upon receiving a distribution request from the client computers (112 and 113).

Each of the distribution protocol-supporting WWW proxy (110) and the distribution protocol-supporting video distribution proxy (111) operates in accordance with the procedures shown in FIG. 3, receives contents from the contents distribution servers (106 to 109), and sends the contents to the WWW proxy (903) or the video distribution proxy (904). Alternatively, each of the distribution protocol-supporting WWW proxy (110) and the distribution protocol-supporting video distribution proxy (111) acquires contents by sending a distribution request to the distribution protocol-supporting WWW server (104) or the distribution protocol-supporting video distribution server (105) and sends the contents to the WWW proxy (903) or the video distribution proxy (904).

Upon accepting the distribution request, each of the distribution protocol-supporting WWW server (104) and the distribution protocol-supporting video distribution server (105) checks whether the requested contents exist in the storage device attached to its own node. If the requested contents exist, the contents are sent to the distribution protocol-supporting WWW proxy (110) or the distribution protocol-supporting video distribution proxy (111) which has issued the distribution request. If the contents do not exist, the distribution protocol-supporting WWW server (104) or the distribution protocol-supporting video distribution server (105) issues a distribution request to a corresponding WWW server (901) or video distribution server (902) to acquire the contents. The contents are sent to the distribution protocol-supporting WWW proxy (110) or the distribution protocol-supporting video distribution proxy (111) which has issued the distribution request. Furthermore, the distribution protocol-supporting WWW server (104) or the distribution protocol-supporting video distribution server (105) stores the contents in the disk attached to its own node, and then issues a request to register the contents to the contents distribution servers (106 to 109).

In this system, the distribution protocol-supporting WWW server (104), the distribution protocol-supporting video distribution server (105), the distribution protocol-supporting WWW proxy (110), and the distribution protocol-supporting video distribution proxy (111) perform contents distribution by using the distribution protocol. Accordingly, efficient contents distribution can be implemented without modifying the servers other than the servers (104 to 111) of the CDN provider.

A description will be given of a third embodiment of the present invention with reference to FIGS. 14 to 16. In the first and second embodiments, all the contents deliveries to the WWW client (112) or the video distribution client (113) are performed by the distribution protocol-supporting WWW proxy (110) or the distribution protocol-supporting video distribution proxy (111). Accordingly, these proxies are likely to become a bottleneck. In this embodiment, to eliminate this bottleneck, contents deliveries are directly performed by the contents distribution servers (106 to 109) with no servers interposed therebetween. Therefore, this embodiment is different from the first embodiment in operations of the distribution protocol-supporting WWW proxy, the distribution protocol-supporting video distribution proxy and the contents distribution servers. Hereinafter, operation procedures of these servers will be shown.

Figure 14:
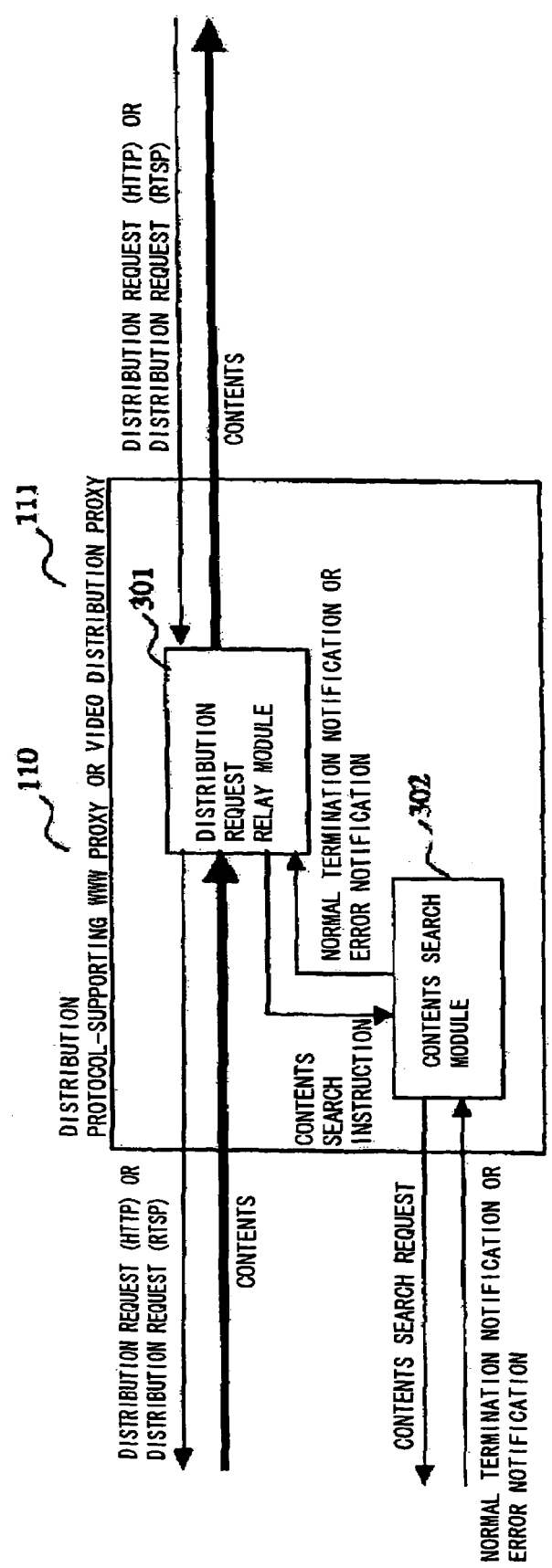
FIG. 14 is a block diagram showing operation procedures of the distribution protocol-supporting www proxy (110) and the distribution protocol-supporting video distribution proxy (111) in a third embodiment.

FIG. 14 is a function block diagram showing operations of the distribution protocol-supporting WWW proxy (110) and the distribution protocol-supporting video distribution proxy (111).

Each distribution request relay module (301) of the distribution protocol-supporting WWW proxy (110) and the distribution protocol-supporting video distribution proxy (111) starts operating upon accepting a distribution request from the WWW client (112) or the video distribution client (113).

Upon accepting the request, the distribution request relay module (301) instructs the contents search module (302) to search for the contents.

The contents search module (302) issues a contents search request to the group of the contents distribution servers (106 to 109) by using the distribution protocol.

FIG. 17 is a view showing information included in the contents search request. The contents search request includes a client IP address field (1701) in addition to the information included in that of the first embodiment. This field stores an IP address of the WWW client (112) or the video distribution client (113) which has issued the distribution request.

Each of the contents distribution servers (106 to 109) searches for the requested contents. If holding the requested contents, the contents distribution server (106 to 109) sends the requested contents to the WWW client (112) or the video distribution client (113) which has issued the distribution request, and notifies the contents search module (302) that the processing is normally finished. When the contents distribution servers (106 to 109) do not hold the requested contents, an error is notified.

In the case of accepting the error notification, the distribution request relay module (301) issues a distribution request to the distribution protocol-supporting WWW server (104) or the distribution protocol-supporting video distribution server (105) and acquires the requested contents.

The distribution request relay module (301) sends the acquired contents to the WWW client (112) or the video distribution client (113).

Figure 15:
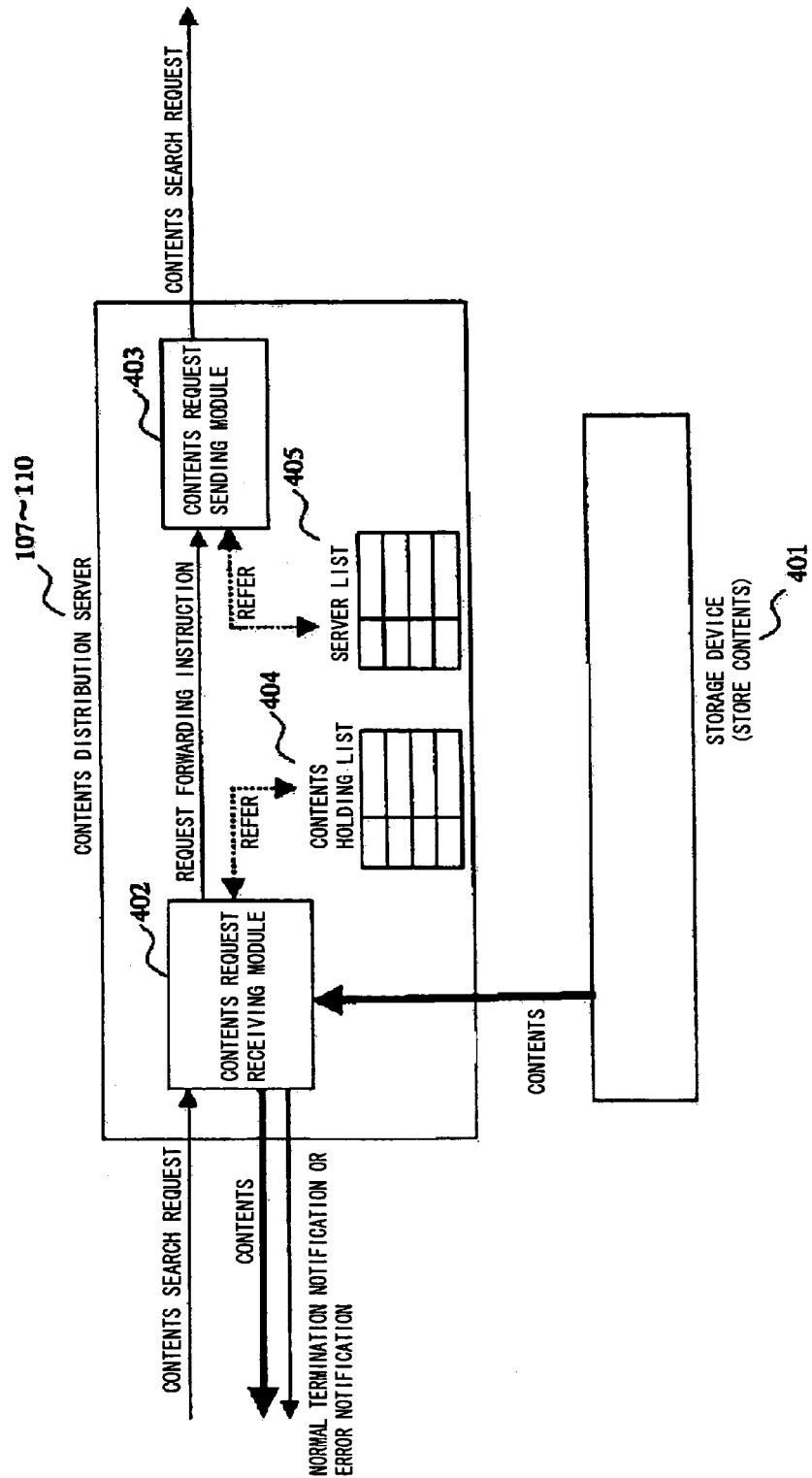
FIG. 15 is a block diagram showing operation procedures of the contents distribution servers (106 to 109) in the third embodiment.
Figure 16:
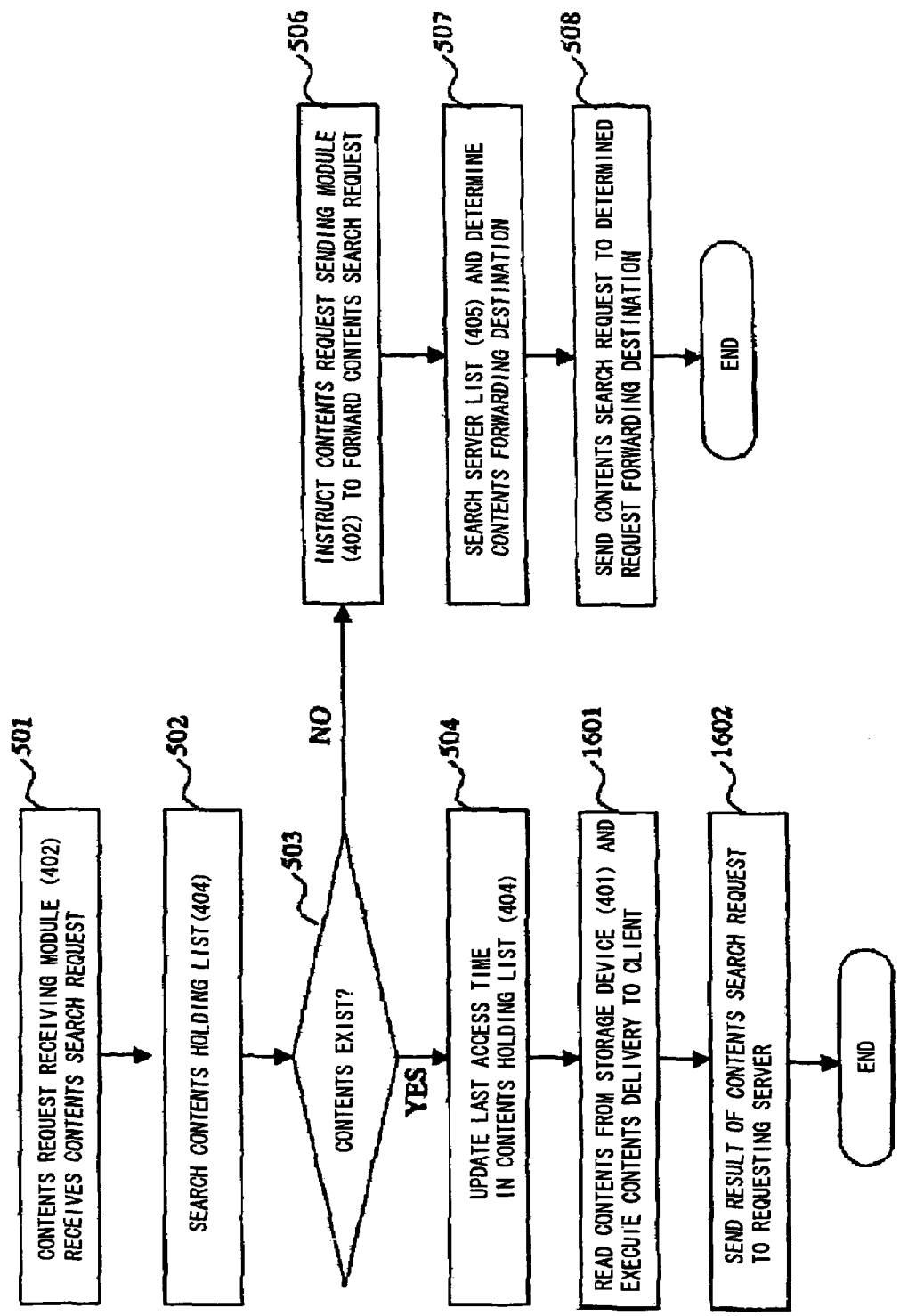
FIG. 16 is an operation flowchart of the contents distribution servers (106 to 109) in the third embodiment.

FIGS. 15 and 16 illustrate a function block diagram and a flowchart, respectively, showing operation of the contents distribution servers (106 to 109).

The difference from the first embodiment is that steps 1601 and 1602 are executed instead of the step 505.

In the step 1601, the contents request receiving module (402) reads the contents from the storage device and distributes the contents to the WWW client (112) or the video distribution client (113). The IP address of the client to which the contents is distributed is determined by referring to the client IP address field (1701) of the received contents search request.

In the step 1602, the contents request receiving module (402) sends to the server which has issued the request, a contents search result which notifies that the processing is normally finished. Herein, the server which has issued the request is determined by referring to the requesting server IP address field (1002) of the received contents search request.

According to this embodiment, it is sufficient that each of the distribution protocol-supporting WWW proxy (110) and the distribution protocol-supporting video distribution proxy (111) distributes contents to the WWW client or the video distribution client only when the contents search using the distribution protocol is failed, thus reducing loads on these proxies.

According to the present invention, the data distribution modules independent of the types of the data send/receive protocol are installed in the servers of the CDN provider and the proxy servers in each company (client) and the service provider in advance. Accordingly, when the servers of the service provider introduce a new service using server software based on any type of data send/receive protocol, it becomes possible to eliminate the necessity to install new server software in a large number of servers (copy servers) of CDN provider which are placed on the network.

Moreover, a contents transmission technology can be provided, in which server software using different types of data send/receive protocol can share a disk capacity without manual setting of capacities for respective server software applications.

Furthermore, in the case where contents on which access requests are concentrated at a time are included in a service, it is possible to eliminate the overhead for the access requests in the server of the service provider which performs the centralized management of contents.

Although the preferred embodiments of the present invention have been described in detail, it should be understood that various changes, substitutions and alterations can be made therein without departing from spirit and scope of the inventions as defined by the appended claims.

What is claimed is:

1. A network system, comprising:
a distribution computer including a distribution storage device;
a distribution request computer configured to issue a send request to obtain contents stored in said distribution storage device;
a plurality of copy computers, each copy computer including a copy storage device configured to store as copy contents a copy of selected contents of said contents stored in said distribution storage device, the distribution computer being configured to designate a selected one of the plurality of copy computers to store a copy of the selected contents in the storage device under control thereof, the plurality of copy computers being located at positions closer to the distribution request computer than the distribution computer; and
a search computer in communication with the distribution computer and one of the plurality of copy computers, the search computer including a contents search module configured to send a contents search request to the first copy computer based on said send request,
wherein each copy computer further includes a server list configured to store information indicating another copy computer,
wherein the distribution computer further includes a contents registration module which, when the contents in the distribution storage device are updated, sends a copy request and copy contents of the updated contents to the designated one of said plurality of copy computers, the copy request giving an instruction to create the copy contents in the copy storage device of the designated copy computer,
wherein, when receiving a copy request from the distribution computer, the copy computer receiving the request creates a copy of the updated contents in the storage device under control thereof,
wherein, when receiving a send request from said distribution request computer, the search computer sends a contents search request to the one of the plurality of copy computers,
wherein, when receiving the contents search request from the search computer, the copy computer receiving the request searches the copy storage device under control thereof to determine whether a copy of the contents being searched exists in the copy storage device, returns the copy of the contents to the search computer if the copy of the contents exists, determines whether the information indicating another copy computer of the plurality of copy computers is stored in the server list if the copy of the contents does not exist, forwards the contents search request to the another copy computer indicated by the information if the information is stored in the server list, and sends an error notification to the search computer if the information is not stored in the server list, wherein the search computer sends the contents to the distribution request computer upon receiving the contents from the copy computer, wherein the search computer sends the send request to the distribution computer upon receiving the error notification from the copy computer, wherein the contents registration module sends the copy request and the copy contents to the designated one of the plurality of copy computers when receiving the send request from the search computer, wherein said send request issued by said distribution request computer is based on a transmission protocol selected from HTTP and RTSP, wherein each of the distribution computer, search computer, and plurality of copy computers include a distribution module programmed to communicate using a distribution protocol that is independent of the transmission protocol, such that contents are able to be written to, and read from, said distribution storage device regardless of a difference between the transmission protocol and the distribution protocol and without setting a disk capacity for each server application accessing said contents, wherein the distribution computer further periodically activates the contents registration module to determine whether new contents are to be stored from a storage device, and when new contents are to be stored, read the new contents and send the new contents and a contents registration request to the plurality of copy computers, and wherein the contents registration module when activated controls a time to send the new contents to the plurality of copy computers according to one of a state of the network system and a type of the new contents.

2. A network system according to claim 1, wherein, based on a type of said contents or a state of said network system, said contents registration module of said distribution computer specifies said selected one of said plurality of copy computers to which said copy request and said copy contents are to be sent.

3. A network system according to claim 2, wherein said contents search module of said search computer searches for one of said plurality of copy computers based on a map.

4. A network system according to claim 1, wherein said contents registration module of said distribution computer controls a timing for sending said copy request and said copy contents based on a type of said contents or a state of said network system.

5. A network system according to claim 1, wherein said contents search module of said search computer searches for one of said plurality of copy computers based on a map.

6. A network system comprising:
a distribution computer including a distribution storage device which stores contents;
a distribution request computer which issues a send request to obtain said contents;
a plurality of copy computers, each copy computer including a copy storage device configured to store as copy contents a copy of selected contents of said contents stored in said distribution storage device, each copy computer further including a server list configured to store information indicating another copy computer, and the distribution computer being configured to designate a selected one of the plurality of copy computers to store a copy of the selected contents in the storage device under control thereof, whereby the plurality of copy computers being located at positions closer to the distribution request computer than the distribution computer;
a search computer in communication with the distribution computer and one of the plurality of copy computers; and
a distribution protocol-supporting computer including a contents registration module which, when said contents are updated in said distribution storage device, sends a copy request and copy contents of said updated contents to the designated one of said plurality of copy computers, said copy request giving an instruction to create said copy contents in said storage device of said designated copy computer, wherein, when receiving a copy request from the distribution protocol-supporting computer, the copy computer receiving the request creates a copy of said updated contents in the storage device under control thereof, wherein, when receiving a send request from said distribution request computer, the search computer sends a contents search request to the one of the plurality of copy computers, wherein, when receiving the contents search request from the search computer, the copy computer receiving the request searches the copy storage device under control thereof to determine whether a copy of the contents being searched exists in the copy storage device, the copy computer returns the copy of the contents to the search computer if the copy of the contents exists, the copy computer determines whether the information indicating another copy computer of the plurality of copy computers is stored in the server list if the copy of the contents does not exist, the copy computer forwards the contents search request to the another copy computer indicated by the information if the information is stored in the server list, and the copy computer sends an error notification to the search computer if the information is not stored in the server list, wherein the search computer sends the contents to the distribution request computer upon receiving the contents from the copy computer, wherein the search computer sends the send request to the distribution protocol-supporting computer upon receiving an error notification from the copy computer, wherein the contents registration module sends the copy request and the copy contents to the designated one of the plurality of copy computers when receiving the send request from the search computer, wherein said send request issued by said distribution request computer is based on a transmission protocol selected from HTTP and RTSP, wherein each of the distribution computer, distribution protocol-supporting computer, search computer, and plurality of copy computers include a distribution module programmed to communicate using a distribution protocol that is independent of the transmission protocol, such that contents are able to be written to, and read from, said distribution storage device regardless of a difference between the transmission protocol and the distribution protocol and without setting a disk capacity for each server application accessing said contents, wherein the contents registration module is periodically activated to determine whether new contents are to be stored from a storage device, and when new contents are to be stored, read the new contents and send the new contents and a contents registration request to the plurality of copy computers, and wherein the contents registration module when activated controls a time to send the new contents to the plurality of copy computers according to one of a state of the network system and a type of the new contents.

7. A computer-readable medium containing computer program software implementing procedures for storing copy contents of contents stored in a contents distribution computer into a determined copy computer of a plurality of copy computers, the computer program software including instructions that being executed by a processor, cause the processor to perform the steps of:

receiving to a first copy computer of a plurality of copy computers a search request from a search request computer to determine whether said copy contents are stored in a storage device of the first copy computer, based on a send request from a distribution request computer to send said contents, the copy contents existing at most once in the plurality of copy computers;

carrying out a search as to whether said copy contents are stored in the storage device of the first copy computer, based on said search request;

sending the copy contents to the search request computer when said copy contents are stored in the storage device of the first copy computer;

storing server list information identifying at least a second copy computer in the plurality of copy computers in a server list, including a requesting server address indicating said search computer and a forwarding destination address indicating said second copy computer;

determining whether said information corresponding to said search request computer having sent said search request is stored in said server list;

forwarding said search request to said second copy computer identified by said forwarding destination address included in said information when said copy contents are not stored in the storage device of the first copy computer and said information is stored in said server list, such that if a storage device of the second computer stores said copy contents the second copy computer is configured to send said copy contents to said distribution search request computer;

sending an error notification to the search request computer when said copy contents are not stored in the storage device of the first copy computer and said information is not stored in said server list, such that said search request computer sends said send request to said distribution computer, wherein said send request issued by said distribution request computer is based on a transmission protocol selected from HTTP and RTSP, wherein each of the contents distribution computer, search computer, and plurality of copy computers include a distribution module programmed to communicate using a distribution protocol that is independent of the transmission protocol, such that contents are able to be written to, and read from, one of the storage devices regardless of a difference between the transmission protocol and the distribution protocol and without setting a disk capacity for each server application accessing said contents, wherein a contents registration module is periodically activated to determine whether new contents are to be stored from a storage device, and when new contents are to be stored, read the new contents and send the new contents and a contents registration request to the plurality of copy computers, and wherein the contents registration module when activated controls a time to send the new contents to the plurality of copy computers according to one of a state of the network system and a type of the new contents.

8. A network system comprising:

a distribution computer including a distribution storage device which stores contents;

a distribution request computer operable to issue a send request to obtain contents stored in said distribution storage device;

a plurality of copy computers, each copy computer including a copy storage device configured to store as copy contents a copy of selected contents of said contents stored in said distribution storage device, the distribution computer being configured to designate a selected one of the plurality of copy computers to store a copy of the selected contents in the storage device under control thereof, the plurality of copy computers being located at positions closer to the distribution request computer than the distribution computer;

a search computer in communication with the distribution computer and one of the plurality of copy computers, the search computer including a contents search module configured to send a contents search request to said one of the plurality of copy computers based on said send request; and a contents registration module which, when the contents in the distribution storage device are updated, sends a copy request and copy contents of said updated contents to the designated one of said plurality of copy computers, said copy request giving an instruction to create said copy contents in said storage device of said designated copy computer;

wherein each copy computer further includes a server list configured to store information including a request type indicating said copy request or said contents search request, a requesting server address indicating said distribution computer or said search computer, and a forwarding destination address indicating another copy computer, wherein, when receiving said contents search request from said search computer, said copy computer searches said copy storage device under control thereof to determine whether a copy of said contents being searched exists in said copy storage device, returns said copy of said contents to said search computer if said copy of said contents exists, determines whether said information corresponding to said contents search request and said search computer which has sent said search request is stored in said server list, if said copy of said contents does not exist in said copy storage device, forwards said contents search request to said another copy computer indicated by said forwarding destination address included in said information if said corresponding information is stored in said server list, and sends an error notification to the search computer if the information is not stored in the server list, wherein said search computer sends said contents to said distribution request computer upon receiving said contents from said copy computer, wherein said search computer sends said send request to said distribution computer upon receiving said error notification from said copy computer, wherein said contents registration module sends said copy request and said copy contents to said designated one of said plurality of copy computers when receiving said send request from said search computer, wherein, when receiving said copy request and said copy contents from said contents registration module, said copy computer stores a copy of said contents in said copy storage and forwards said copy request and said copy contents to said another copy computer indicated by said forwarding destination address included in said information if said information corresponding to said copy request and said distribution computer is stored in said server lists wherein said send request issued by said distribution request computer is based on a transmission protocol selected from HTTP and RTSP, wherein each of the distribution computer, search computer, and plurality of copy computers include a distribution module programmed to communicate using a distribution protocol that is independent of the transmission protocol, such that contents are able to be written to, and read from, said distribution storage device regardless of a difference between the transmission protocol and the distribution protocol and without setting a disk capacity for each server application accessing said contents, wherein the contents registration module is periodically activated to determine whether new contents are to be stored from a storage device, and when new contents are to be stored, read the new contents and send the new contents and a contents registration request to the plurality of copy computers, and wherein the contents registration module when activated controls a time to send the new contents to the plurality of copy computers according to one of a state of the network system and a type of the new contents.

* * * * *